United States Patent
Moroo et al.

(10) Patent No.: US 8,103,052 B2
(45) Date of Patent: Jan. 24, 2012

(54) METHOD OF EMBEDDING INFORMATON INTO IMAGE

(75) Inventors: Jun Moroo, Kawasaki (JP); Kenichiro Sakai, Kawasaki (JP); Hirotaka Chiba, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 774 days.

(21) Appl. No.: 12/285,245

(22) Filed: Sep. 30, 2008

(65) Prior Publication Data

US 2009/0123027 A1 May 14, 2009

(30) Foreign Application Priority Data

Nov. 13, 2007 (JP) ................................. 2007-294539

(51) Int. Cl.
*G06K 9/00* (2006.01)
*H04L 9/32* (2006.01)
(52) U.S. Cl. ........................ 382/100; 713/176
(58) Field of Classification Search ................ 382/100, 382/232, 240; 380/51, 54, 210, 252, 287; 370/522–529; 283/72.74–81, 85, 93; 713/176, 713/179; 358/3.28
See application file for complete search history.

(56) References Cited

U.S. PATENT DOCUMENTS

| | | | |
|---|---|---|---|
| 6,553,127 B1 * | 4/2003 | Kurowski | 382/100 |
| 6,785,814 B1 * | 8/2004 | Usami et al. | 713/176 |
| 7,770,008 B2 * | 8/2010 | Walmsley | 713/170 |
| 2003/0033530 A1 | 2/2003 | Sharma et al. | |
| 2004/0218782 A1 | 11/2004 | Brunk | |
| 2004/0234139 A1 | 11/2004 | Moroo et al. | |

FOREIGN PATENT DOCUMENTS

| | | |
|---|---|---|
| EP | 1 480 163 A2 | 11/2004 |
| JP | 2004-349879 | 12/2004 |
| JP | 2005-217598 | 8/2005 |

OTHER PUBLICATIONS

European Search Report issued Jan. 29, 2009 in corresponding European Patent Application 08168398.9.
English Translation of Notice of Reasons for Rejection for Japanese Patent Application No. 2007-294539 mailed Oct. 25, 2011.

* cited by examiner

*Primary Examiner* — Abolfazl Tabatabai
(74) *Attorney, Agent, or Firm* — Staas & Halsey LLP

(57) ABSTRACT

According to an aspect of an embodiment, a method of embedding information into an image has obtaining an image data by taking the image by an image input device, dividing the image data into a plurality of blocks, determining an area in each of the blocks on the basis of a resolution power of the image input device, where a characteristic value may be modified in accordance with the information, respectively, comparing the size of the block with the size of the area and modifying a characteristic value of each of the blocks in accordance with the information to be embedded when the ratio of the size of the area with respect to the size of the blocks is smaller than a predetermined value.

9 Claims, 19 Drawing Sheets

METHOD OF EMBEDDING INFORMATON INTO IMAGE

BACKGROUND

The present technique relates to an image processing method, control program and image processing apparatus for embedding information into an image.

In order to prevent forgery, prevent illegal use or provide an added service, technologies have been developed for embedding information to a print image or digital data, for example. The embedding information is not recognized by human eyes. An image containing the information may be used for claiming a right or for user interface, for example. The technologies allow information such as the name of a copyright holder and copy histories to be embedded to a print image and thus can prevent information leaks and/or copying. Encoded information may be embedded to a print image. Then, the code is obtained from the image with an input device such as a camera provided in a mobile information terminal to access the Internet.

One method for embedding a code to an image may divide an image into a predetermined number of blocks and changes the characteristic value of a subject block based on the characteristic amount of the image in a predetermined area of the subject block and information to be embedded. This method requires the division of an image into a predetermined number of blocks in order to allow decoding with an input device.

Here, in order to embed a code into a small image, the size of each block must be reduced since the number of blocks to be divided is predetermined. On the other hand, an input device has a characteristic called aperture indicating the pixel resolution. The size of the aperture depends on the input device and the distance from the input device to a subject to be imaged. For that reason, in a case that a code is embedded into a small image, other areas than the area containing the code are also read out for decoding due to the reading limit of the input device. As a result, information cannot be read out correctly.

Technique of the related art is disclosed in Japanese Laid-open Patent Publication No. 2004-349879.

SUMMARY

According to an aspect of an embodiment, a method of embedding information into an image has obtaining an image data by taking the image by an image input device, dividing the image data into a plurality of blocks, determining an area in each of the blocks on the basis of a resolution power of the image input device, where a characteristic value may be modified in accordance with the information, respectively, comparing the size of the block with the size of the area and modifying a characteristic value of each of the blocks in accordance with the information to be embedded when the ratio of the size of the area with respect to the size of the blocks is smaller than a predetermined value.

DESCRIPTION OF THE PREFERRED EMBODIMENTS

Figure 1:
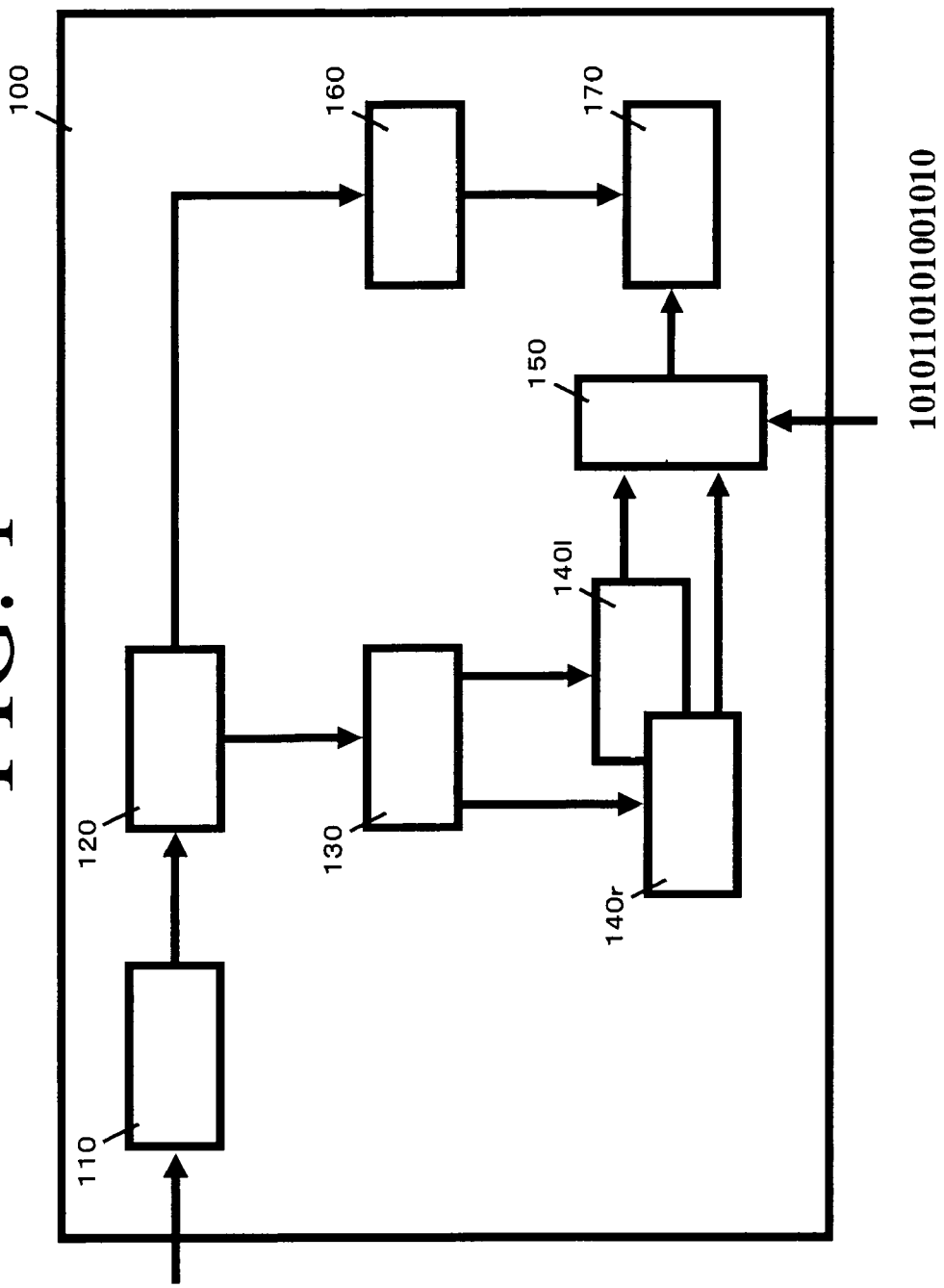
FIG. 1 is a diagram showing a configuration of a decoder according to an embodiment of the present technique.

FIG. 1 is a functional block diagram showing a configuration of an encoder 100, which is an image processing apparatus. The encoder 100 includes block dividing means 110, block extracting means 120, averaging means 130, registers 140$r$ and 140$l$, comparing means 150, block size determining means 160 and encoding means 170. The components of the encoder 100 are mutually connected through control means, not shown.

Figure 2:
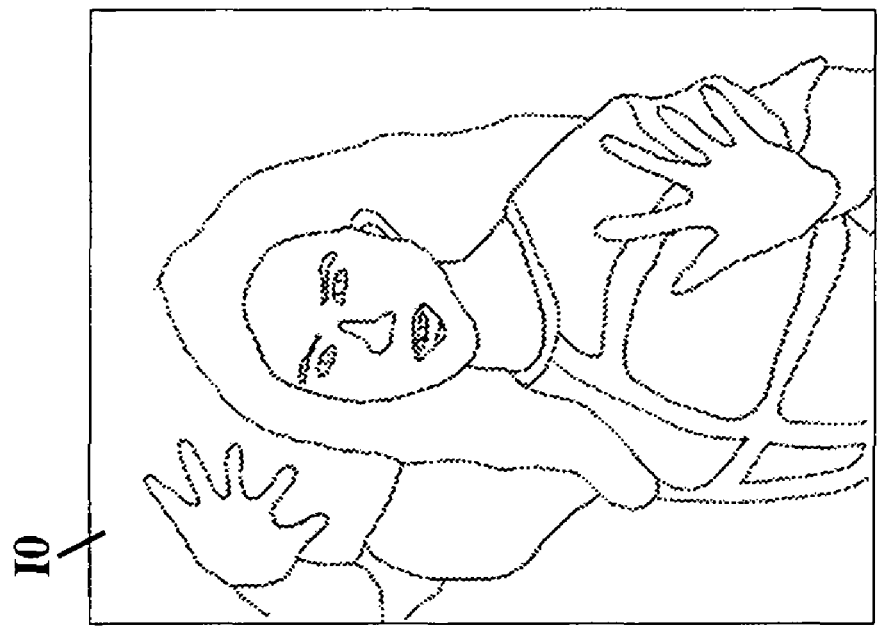
FIG. 2 is a diagram showing an original image.
Figure 3:
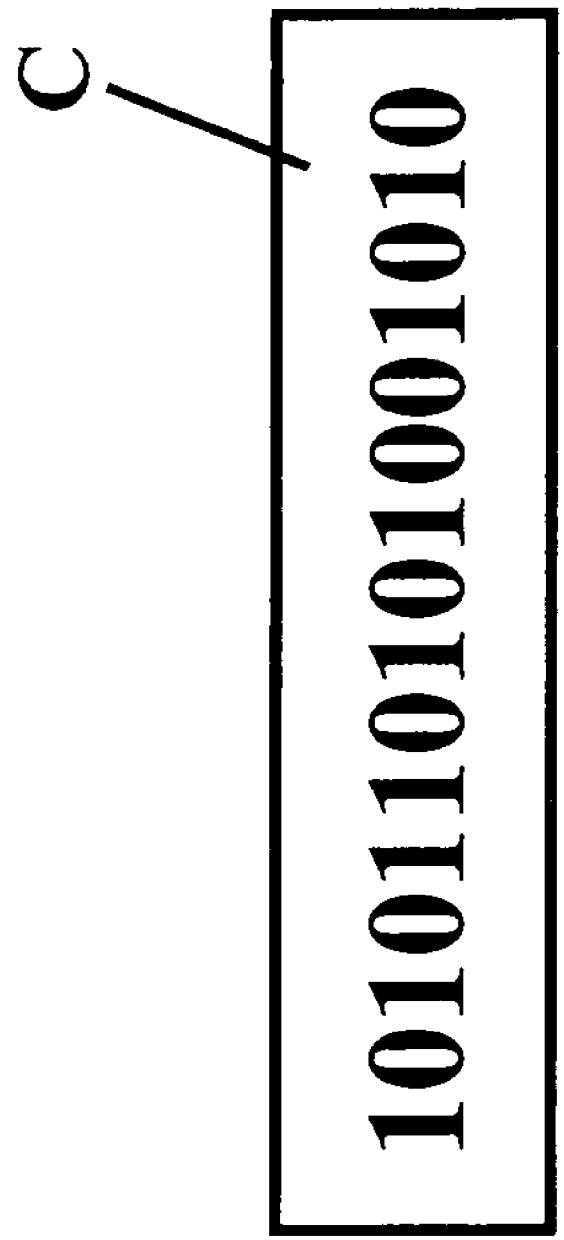
FIG. 3 is a diagram showing a code.

The block dividing means 110 divides an input original image I0 into blocks of N rows×M columns. According to an embodiment of the present technique, an input original image is divided into blocks of 48 rows×38 columns. The block dividing means 110 outputs the data divided into blocks as a block-divided image I1. FIG. 2 shows an example of the original image I0. FIG. 3 shows an example of a code C to be embedded to the original image I0.

The original image I0 is an image that is created based on a predetermined image format. The size of the original image I0 according to an embodiment of the present technique may be 252 pixels wide×318 pixels long. The image format of the original image I0 must be an image format having resolution information such as Bit Map (or BMP) format and TIFF (or Tagged Image File Format).

Figure 4:
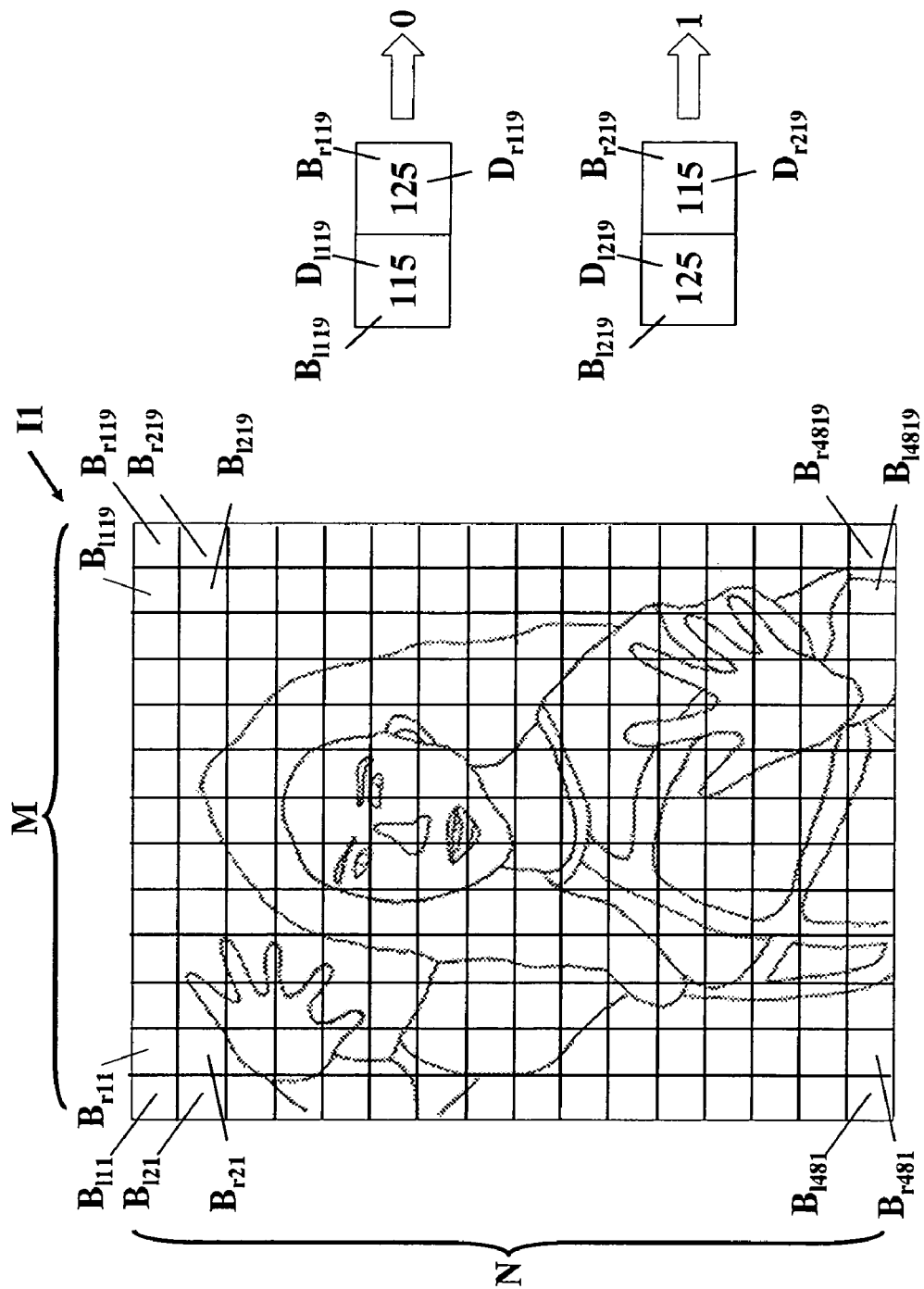
FIG. 4 is a diagram showing a block-divided image.

FIG. 4 shows the block-divided image I1. The block-divided image I1 includes 1824 blocks (of 48 rows×38 columns) of Blocks $B_{l11}$, $B_{r11}$, ... $B_{l119}$, $B_{r119}$, ... $B_{l21}$, $B_{r21}$, ... $B_{l4819}$ and $B_{r4819}$. The block-divided image I1 contains a code of 1 bit in a pair block. Here, the expression, "pair block" refers to two adjacent blocks. More specifically, a pair block includes two blocks of Blocks $B_{l11}$ and $B_{r11}$, $B_{l12}$ and $B_{r12}$, ... $B_{l21}$, and $B_{r21}$, ... $B_{l481}$, and $B_{r481}$ ... and $B_{l4819}$ and $B_{r4819}$.

Here, in one block $B_{lxy}$ of a pair block, the subscript "l" (standing for the left) refers to the left block of the pair block. The subscript "x" refers to a row (N). The subscript "y" refers to a column (M). In the other block $B_{rxy}$ of the pair block, the subscript "r" (standing for the right) refers to the right block of a pair block. The subscript "x" refers to a row (N). The subscript "y" refers to a column (M).

As a characteristic value, the average density of the left block $B_{lxy}$ in a pair block is left average density data Dl, and the average density of the right block $B_{rxy}$ is the right average density data Dr. Here, the expression, "average density" refers to an average tone of images within a block.

Here, when the left average density data $D_l$ is lower than the right average density data Dr, the pair block exhibits "0" as a code for one bit, as in the relational expression:

$$D_l < D_r \rightarrow \text{"0"}$$

On the other hand, when the left average density data $D_l$ is equal to or higher than the right average density data Dr, the pair block exhibits "1" as a code for one bit, as in the relational expression:

$$D_l \geq D_r \rightarrow \text{"1"}$$

For example, in the pair block of the blocks $B_{l119}$ and $B_{r119}$ shown in FIG. 4, the left side average density data $D_{l119}$ is "115", and the right average density data $D_{r119}$ is "125". Therefore, the code for one bit exhibits "0". In the pair block of the blocks $B_{l219}$ and $B_{r219}$, the left side average density data $D_{l219}$ is "125", and the right average density data $D_{r219}$ is "115". Therefore, the code for one bit is "1".

Since the block-divided image I1 has 19 pair blocks on one row, one row exhibits codes for 19 bits. Therefore, 48 rows of the entire block-divided image I1 exhibit codes for 912 bits.

Referring back to FIG. 1, the block extracting means 120 extracts pair blocks from the block-divided image I1 based on the bit shift on the code C. Then, the block extracting means 120 sequentially outputs the density distributions in the block cores of the blocks $B_{lxy}$ and $B_{rxy}$ as average density data D. Here, the bit shift on the code C refers to the shift of a pointer (not shown) on bits to the right side by one bit from the leftmost side bit "1" of the code C shown in FIG. 3 to the right side bit "0". For example, in a case with a code "101", the pointer is shifted from "1" to the right side "0" and "1". The block core refers to the range for extracting a characteristic amount from a block. The details of the block core will be described later.

The block extracting means 120 further calculates the size of a block of the block-divided image I1. Then, the block extracting means 120 outputs the calculation result to the block size determining means 160 as block size data. An example is assumed in which the size of the original image I0 is 252 pixels wide×318 pixels long, and the original image I0 is divided into 38 blocks horizontally and 48 blocks vertically, as shown in FIG. 4. In this case, the horizontal size of each block is 6.63 (252/38) pixels, and the vertical size of each block is 6.33 (318/48) pixels.

The averaging means 130 calculates the left side average density data $D_l$ in the block core of the block $B_{lxy}$ and the right side average density data $D_r$ in the block core of the block $B_{rxy}$ from the average density data D. Then, the averaging means 130 sequentially stores them to the registers 140l and 140r based on the bit shift on the code C.

The comparing means 150 compares the nth bit of the code C and the bit determination result, which is determined based on the height relationship between the left side average density data $D_l$ and the right side average density data $D_r$ stored in the registers 140l and 140r.

The block size determining means 160 calculates the size of the block core based on the resolution of the original image I0 and the aperture size of the input device. The term, "aperture", refers to a characteristic exhibiting the resolution of pixels of reading means of a cellular phone, a digital camera or the like. According to an embodiment of the present technique, the size of the block core is 5.65 (0.41*350/25.4) pixels where the resolution of the original image I0 is 350 dpi and the aperture size of the input device is a radius of 0.41 mm. In this case, the aperture size depends on the input device.

Then, the block size determining means 160 compares the size of the block obtained from the block extracting means 120 and the size of the block core and determines whether the size of the block is larger than the size of the block core or not.

When the size of the block is larger than the size of the block core, the block size determining means 160 outputs information on the size of the block core to the encoding means 170. When the size of the block is equal to or smaller than the size of the block core, the block size determining means 160 outputs an error. In this case, the processing of embedding the code to the original image I0 exits. In the example according to this embodiment, the size of the block is 6.63 pixels×6.63 pixels, and the size of the block core is 5.65 pixels×5.65 pixels. Therefore, the embedding processing is performed thereon normally.

The encoding means 170 performs the processing for embedding the code to the block-divided image I1 (which is the original image I0) based on the comparison result by the comparing means 150. More specifically, if the comparison result by the comparing means 150 is agreement, the encoding means 170 maintains the height relationship between the density data of the left block $B_{lxy}$ and the density data of the right block $B_{rxy}$. When the comparison result by the comparing means 150 is disagreement on the other hand, the height relationship between the density data of the left block $B_{lxy}$ and the density data of the right block $B_{rxy}$ is inverted so as to agree with the size relationship described by the bits of the code C.

The control over the characteristic amounts will be described more specifically. When [the density data of the left block $B_{lxy}$]<[the density data of the right block $B_{rxy}$], the encoding means 170 controls the characteristic amounts based on:

$$D'_{lxy} = (D_{lxy} + D_{rxy})/2 - T/2$$

$$D'_{rxy} = (D_{lxy} + D_{rxy})/2 + T/2$$

where $D_{lxy}$ is the average density data of the block core for the left block before the control over the characteristic amount, and $D_{rxy}$ is the average density data of the block core for the right block before the control over the characteristic amount, $D'_{lxy}$ is the average density data of the block core for the left block after the control over the characteristic amount, and $D'_{rxy}$ is the average density data of the block core for the right block after the control over the characteristic amount, and T is a constant value. Defining T can differentiate the average density data of the left block and the average density data of the right block. The average density data of the left block after the control over the characteristic amount is the value resulting from the subtraction of the constant value from the average value of the block core average density data of left block before the control over the characteristic amount and the block core average density data for the right block before the control over the characteristic amount. On the other hand, the average density data of the right block after the control over the characteristic amount is the value resulting from the addition of the constant value to the average value of the block core average density data of left block before the control over the characteristic amount and the block core average density data for the right block before the control over the characteristic amount.

When [the density data of the left block $B_{lxy}$]≧[the density data of the right block $B_{rxy}$], the encoding means 170 controls the characteristic amounts based on:

$$D'_{lxy} = (D_{lxy} + D_{rxy})/2 + T/2$$

$$D'_{rxy} = (D_{lxy} + D_{rxy})/2 - T/2$$

The average density data of the left block after the control over the characteristic amount is the value resulting from the addition of the constant value to the average value of the block core average density data of left block before the control over the characteristic amount and the block core average density data for the right block before the control over the characteristic amount. On the other hand, the average density data of the right block after the control over the characteristic amount is the value resulting from the subtraction of the constant value from the average value of the block core average density data of left block before the control over the characteristic amount and the block core average density data for the right block before the control over the characteristic amount.

Figure 5:
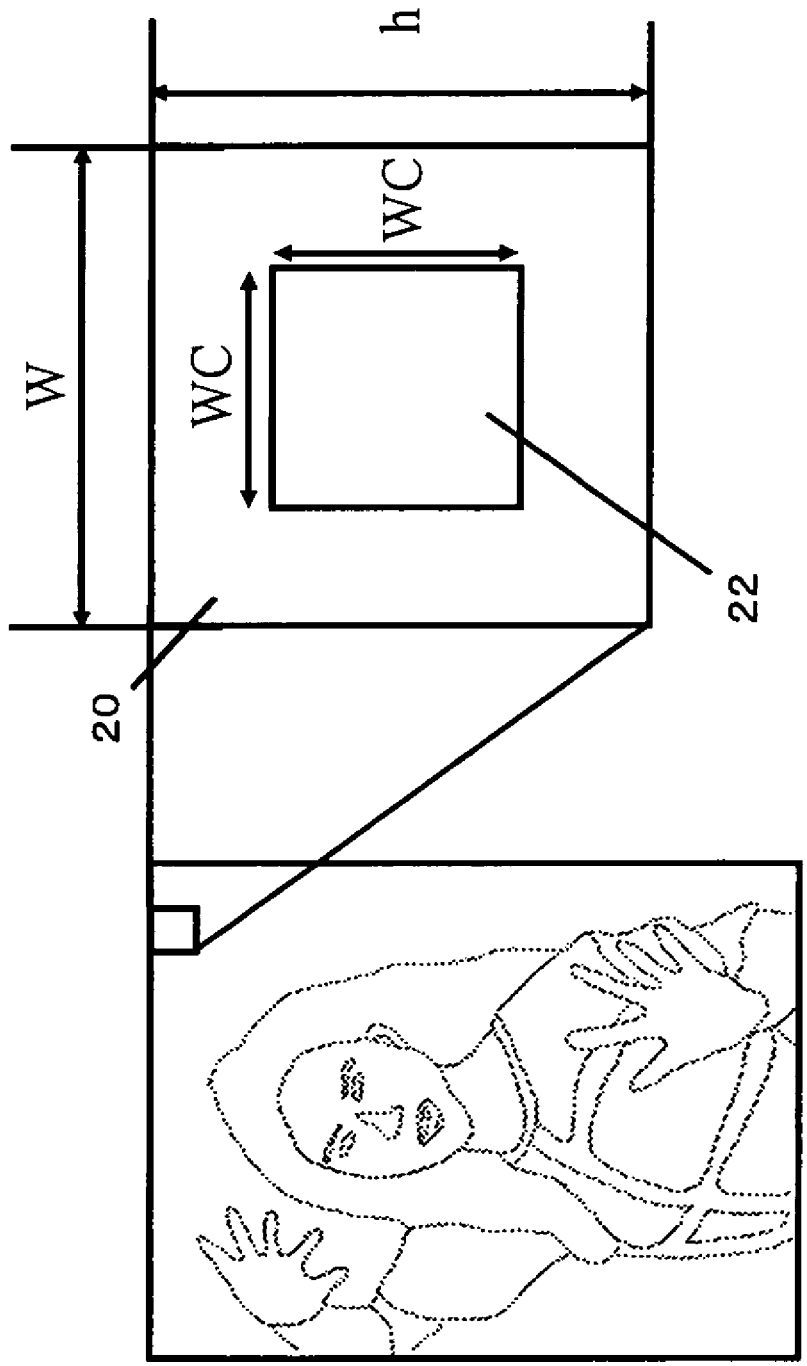
FIG. 5 is a diagram showing a relationship between blocks and block cores.

The encoding means 170 changes the average density data such that the density can be the highest at the center part within the block and that the density can decrease as it goes from the center of the block to the circumference. Thus, the deterioration of the image can be prevented. FIG. 5 is a diagram for describing the processing by the encoding means 170. As shown in FIG. 5, the size of the block 20 is W×h, and the size of the block core 22 is WC×WC. According to this embodiment, while the size of the block 20 is 6.63 pixels× 6.63 pixels, the size of the block core 22 is 5.65 pixels×5.65 pixels in the area where the encoding means 170 controls the characteristic amounts.

Figure 6:
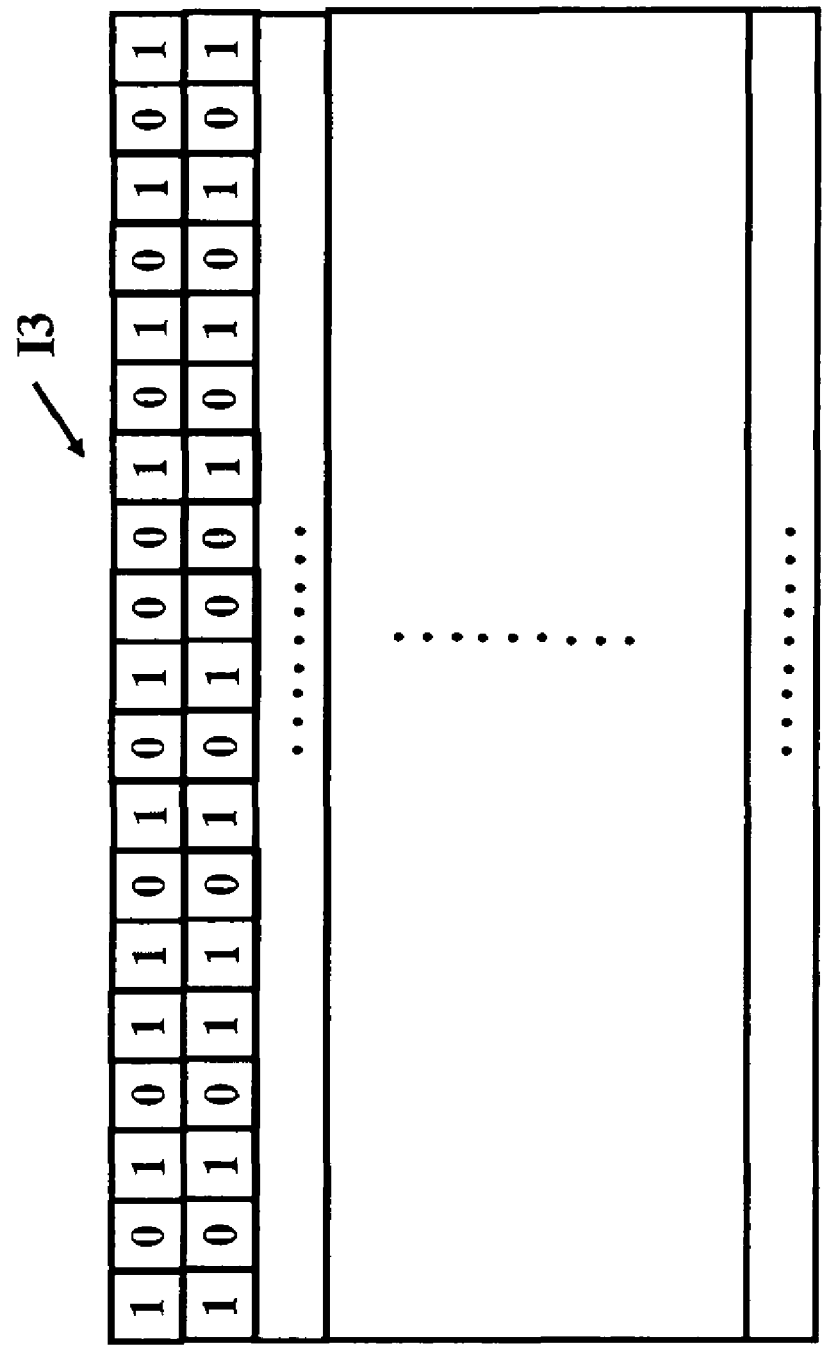
FIG. 6 is a diagram showing an image-encoded data.

The encoding means 170 performs the processing above to create an image-encoded data I3 containing the code in the block-divided image I1 and outputs the created image-encoded data I3. FIG. 6 is a diagram showing an example of the image-encoded data I3. The image-encoded data I3 corresponds to the original image I0 and the block-divided image I1. Since the block-divided image I1 has 992 (19×48) pair blocks, the code of 16 bits is embedded approximately 62 times. The embedded code is read out by a decoder. The decoder decides a majority of values of the bits of the read codes and determines the embedded code. By embedding one same code multiple times in this way, a decoder can determine the embedded code by the decision-by-majority processing, and the performance for reading by a decoder can be improved.

Next, with reference to FIGS. 7 and 8, the processing by the encoder 100 according to this embodiment will be described.

Figure 7:
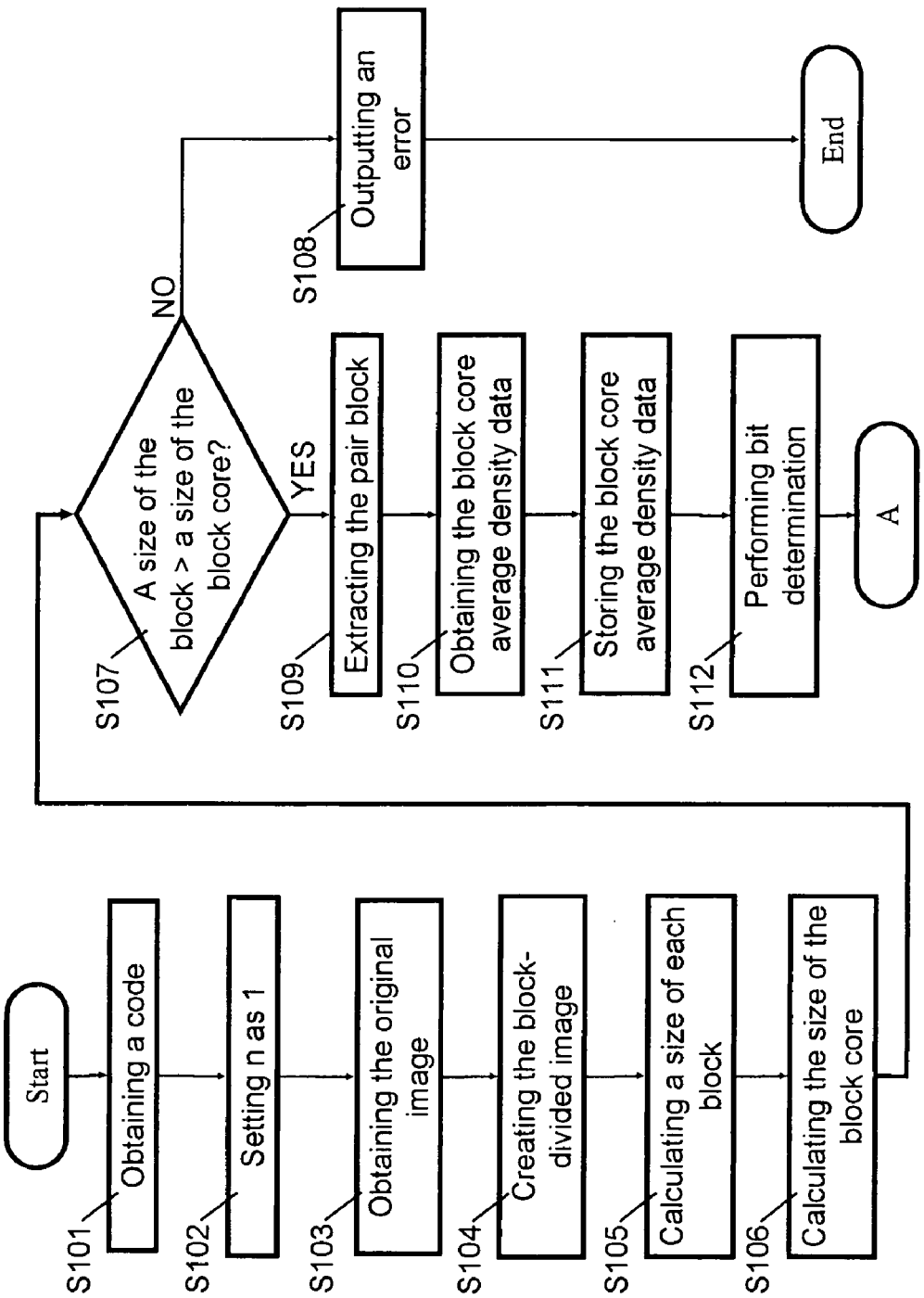
FIG. 7 is a flowchart (#1) showing encoding processing according to an embodiment of the present technique.

In step S101 in FIG. 7, the comparing means 150 obtains the code C. The processing moves to step S102.

In step S102, the comparing means 150 initially sets "1" as n. Here n is a pointer to a bit of the code C. The expression, "n=1" corresponds to the leftmost bit "1" of the code C. The processing moves to step S103.

In step S103, the block dividing means 110 obtains the original image I0. The processing moves to step S104.

In step S104, the block dividing means 110 divides the original image I0 and creates the block-divided image I1. According to this embodiment, the block dividing means 110 creates the divided image I1 resulting from the division of the original image I0 into 48×38. Thus, by keeping the number of blocks to be divided constant, a decoder can recognize the number of blocks contained in the original image I0. Furthermore, by keeping the number of blocks to be divided constant, a constant amount of information can be available for the decision-by-majority processing on the code by a decoder. The block dividing means 110 further outputs the divided image I1 to the block extracting means 120. The processing moves to step S105.

In step S105, the block extracting means 120 calculates the size of each block based on the size of the original image I0. According to this embodiment, the size of each block is 6.63 wide by 6.63 long. The processing moves to step S106.

In step S106, the block size determining means 160 calculates the size of the block core based on the aperture size. As described above, according to this embodiment, the size of the block core is 5.65 pixels long and 5.65 pixels wide. Since the aperture size is known, the size of the block core may be calculated in advance. The processing moves to step S107.

In step S107, the block size determining means 160 compares the size of each block, which is calculated in step S105, and the size of the block core to determine whether the block is larger than the core block or not. Here, the sizes of the block and block core are used as predetermined units for comparing the block and the block core. When the size of the block is larger than the size of the block core, the processing moves to step S109. If the size of the block is smaller than the size of the block core on the other hand, the processing moves to step S108. In step S108, the block size determining means 160 outputs an error, and processing ends. This can avoid embedding code to a block having a smaller block size than the size of the block core. As a result, in decoding, reading an unintentional code can be prevented.

In step S109, the block extracting means 120 extracts the pair block corresponding to n from the block-divided image I1 and then outputs the density distributions in the block cores of the blocks as average density data D to the averaging means 130. In the first cycle, the block extracting means 120 outputs density distributions of the block cores in the blocks $B_{l11}$ and $B_{r11}$ as the average density data D to the averaging means 130. The case with n=1 will be described as a specific example below. The processing moves to step S110.

In step S110, the averaging means 130 performs averaging processing to obtain the block core average density data $D_{l11}$ of the left block corresponding to the block $B_{l11}$ and the block core average density data $D_{r11}$ of the right block corresponding to the block $B_{r11}$. The processing moves to step S111.

In step S111, the averaging means 130 stores the block core average density data $D_{l11}$ of the left block to the register 140$l$ and the block core average density data $D_{r11}$ of the right block to the register 140$r$. The processing moves to step S112.

In step S112, the comparing means 150 obtains the difference in density between the block core average density data $D_{l11}$ and block core average density data $D_{r11}$ stored in the registers 140$l$ and 140$r$ and performs bit determination based on the height relationship of the densities. The processing moves to step S113 in FIG. 8.

Figure 8:
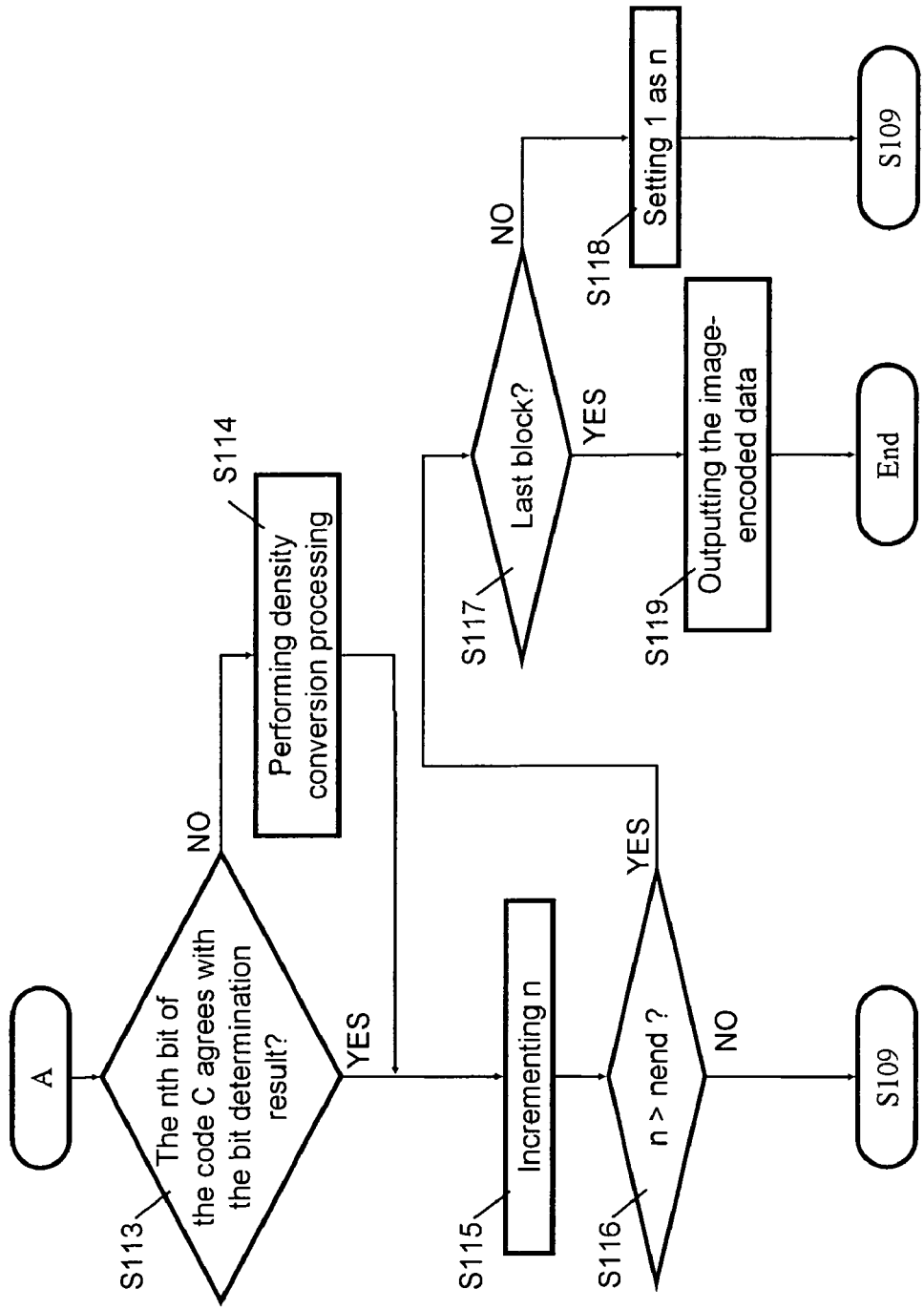
FIG. 8 is a flowchart (#2) showing encoding processing according to the embodiment of the present technique.

In step S113 in FIG. 8, the comparing means 150 determines whether the nth bit of the code C agrees with the bit determination result or not. When the nth bit of the code C does not agree with the bit determination result, processing moves to step S114. When the nth bit of the code C agrees with the bit determination result on the other hand, the processing moves to step S115. In step S114, the encoding means 170 modifies a characteristic value of blocks in accordance with information to be embedded. The encoding means 170 performs density conversion processing for changing the density data of the left block $B_{lxy}$ and the density data of the right block $B_{rxy}$ such that the bit determination result based on the height relationship between the block core average density data $D_{lxy}$ and the block core average density data $D_{rxy}$ can agree with the nth bit of the code C. Here, the density conversion processing refers to processing for inverting the height relationship between the density data of the left block $B_{lxy}$ and the density data of the right block $B_{rxy}$.

In step S115, the comparing means 150 increments n. The processing moves to step S116.

In step S116, the comparing means 150 determines whether n is higher than nend or not. The expression "nend" is the number of bits of the code C and may be 16, for example, according to this embodiment. When n is lower than nend, embedding the code has not completed. Therefore, processing returns to step S109. Then, in step S109, the block extracting means 120 extracts the pair block corresponding to n+1 and then outputs the density distributions in the block cores of the blocks as average density data D to the averaging means 130. On the other hand, when n is higher than nend, embedding the code C has completed. Therefore, processing moves to step S117.

In step S117, the comparing means 150 determines whether the block to be compared is the last block or not. If the block to be compared is the last block, the code cannot be embedded any more. Therefore, the processing moves to step S119. On the other hand, if the block to be compared is not the last block, the processing moves to step S118.

In step S119, the encoding means 170 outputs the image-encoded data I3. The output image-encoded data I3 may be stored in a magnetic disk device (such as an HDD or a hard disk drive).

In step S118, the comparing means 150 sets 1 as n. The processing returns to step S109 to perform processing of embedding the code.

As described above, in the encoder 100 according to this embodiment, the block dividing means 110 divides the original image I0 into a plurality of blocks. Then, the block size determining means 160 compares the block size and the size of the block core and stops embedding the code to the original image I0 when the block size is equal to or smaller than the size of the block core. This can prevent improper embedding of data to the original image I0, which may not be decoded.

Figure 9:
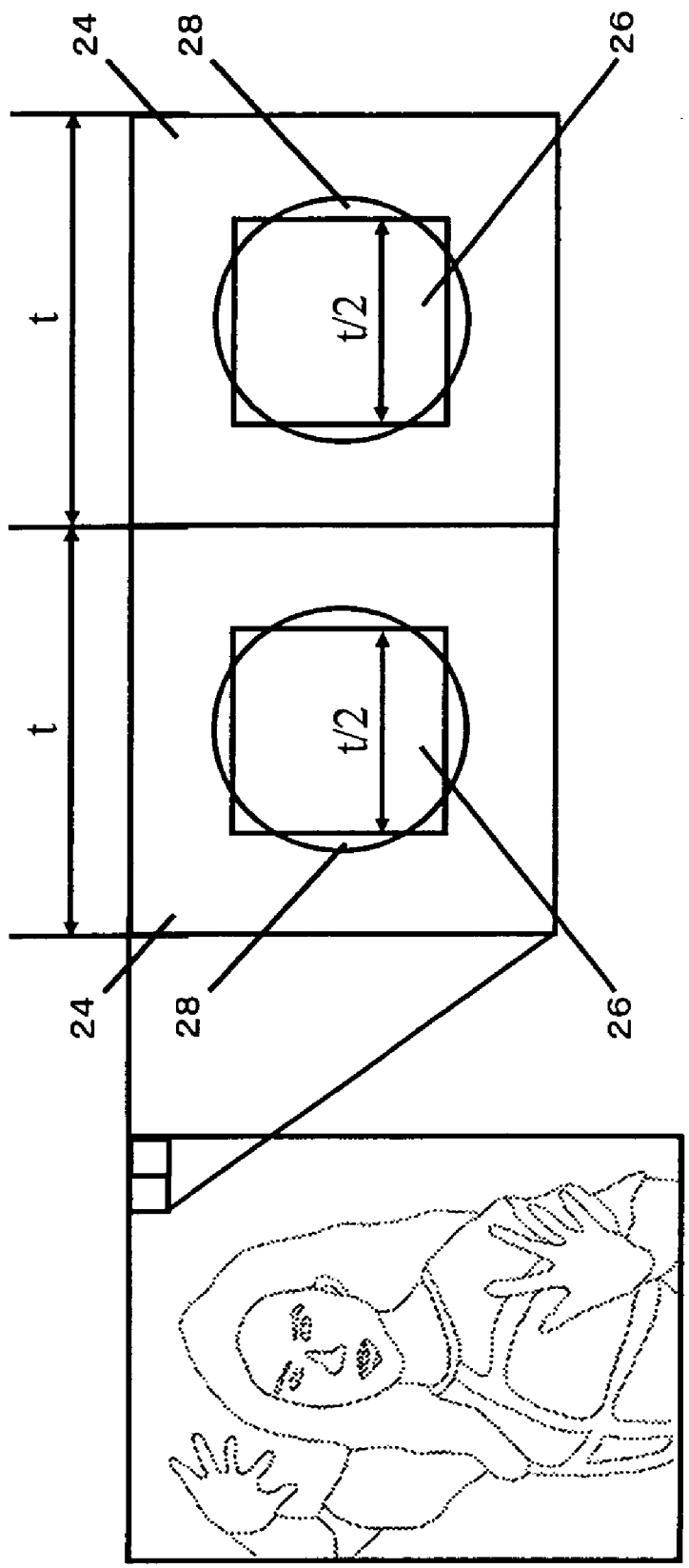
FIG. 9 is a diagram (#1) showing a relationship between apertures and block cores.
Figure 10:
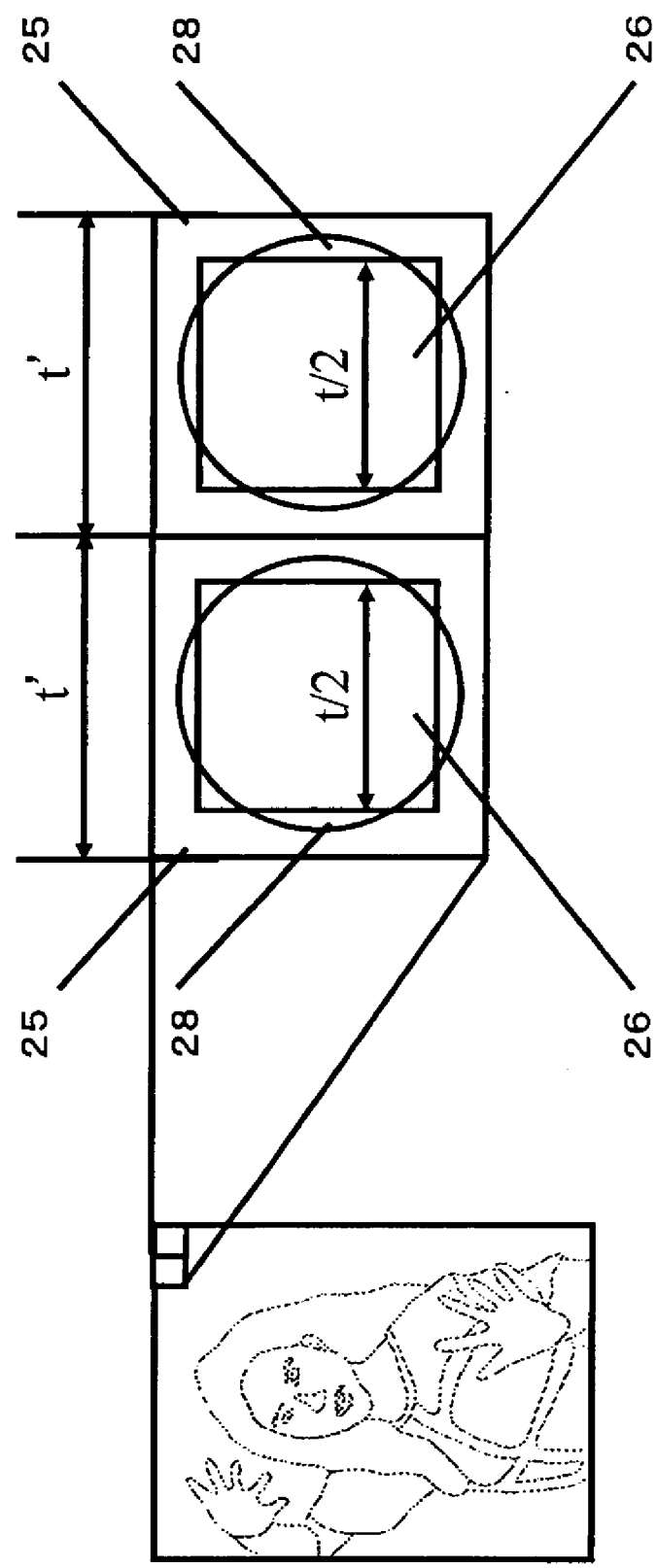
FIG. 10 is a diagram (#2) showing the relationship between the apertures and the block cores.

FIG. 9 shows the relationship between block cores 26 and apertures 28 on a general image. Here, the size of the block 24 is t×t, and the size of the block core 26 is t/2×t/2. FIG. 10 on the other hand shows the relationship between the block cores 26 and the apertures 28 on a smaller image than a general image. Here, the size of the block 25 is t'×t' where t>t'. Also in this case, the size of the block core 26 is not t'/2×t'/2 but t/2×t/2. Thus, irrespective of the size of an image, data can be embedded thereto by changing the characteristic amount in an area in a predetermined size on paper. Therefore, data can be embedded even to a smaller image.

Having described the case that a code is embedded to an image by handing the average densities of an image as the characteristic amounts according to this embodiment, the barycenter or distribution of the granularity, chroma or density may be handled as the characteristic amounts to embed a code.

The position where the characteristic amount is to be changed in a block on a block-divided image may be anywhere within the block and may be distributed variously. By distributing positions where the characteristic amounts are to be changed in this way, the influence of image deterioration can be reduced.

Figure 11:
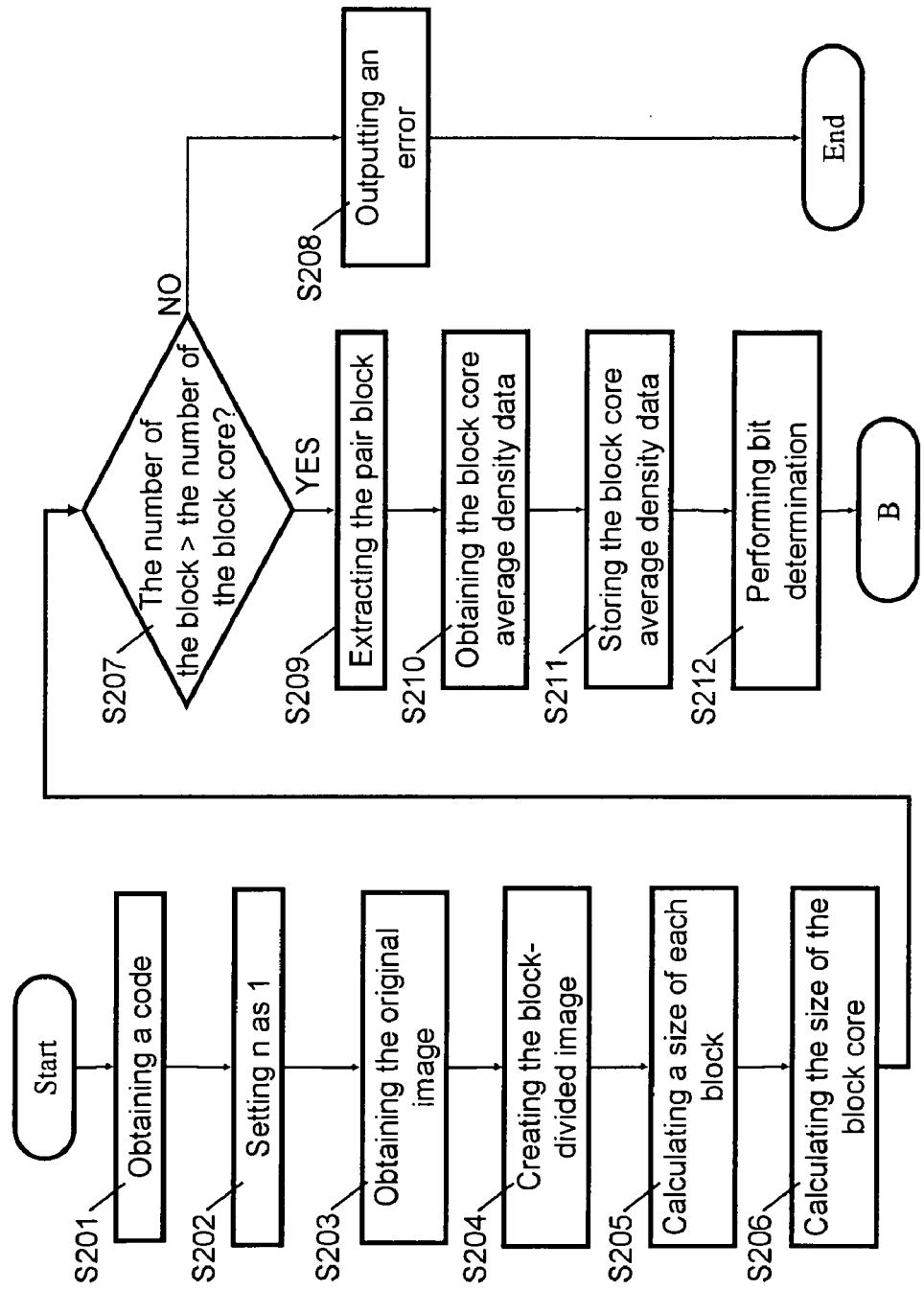
FIG. 11 is a flowchart (#3) showing encoding processing according to an embodiment of the present technique.
Figure 12:
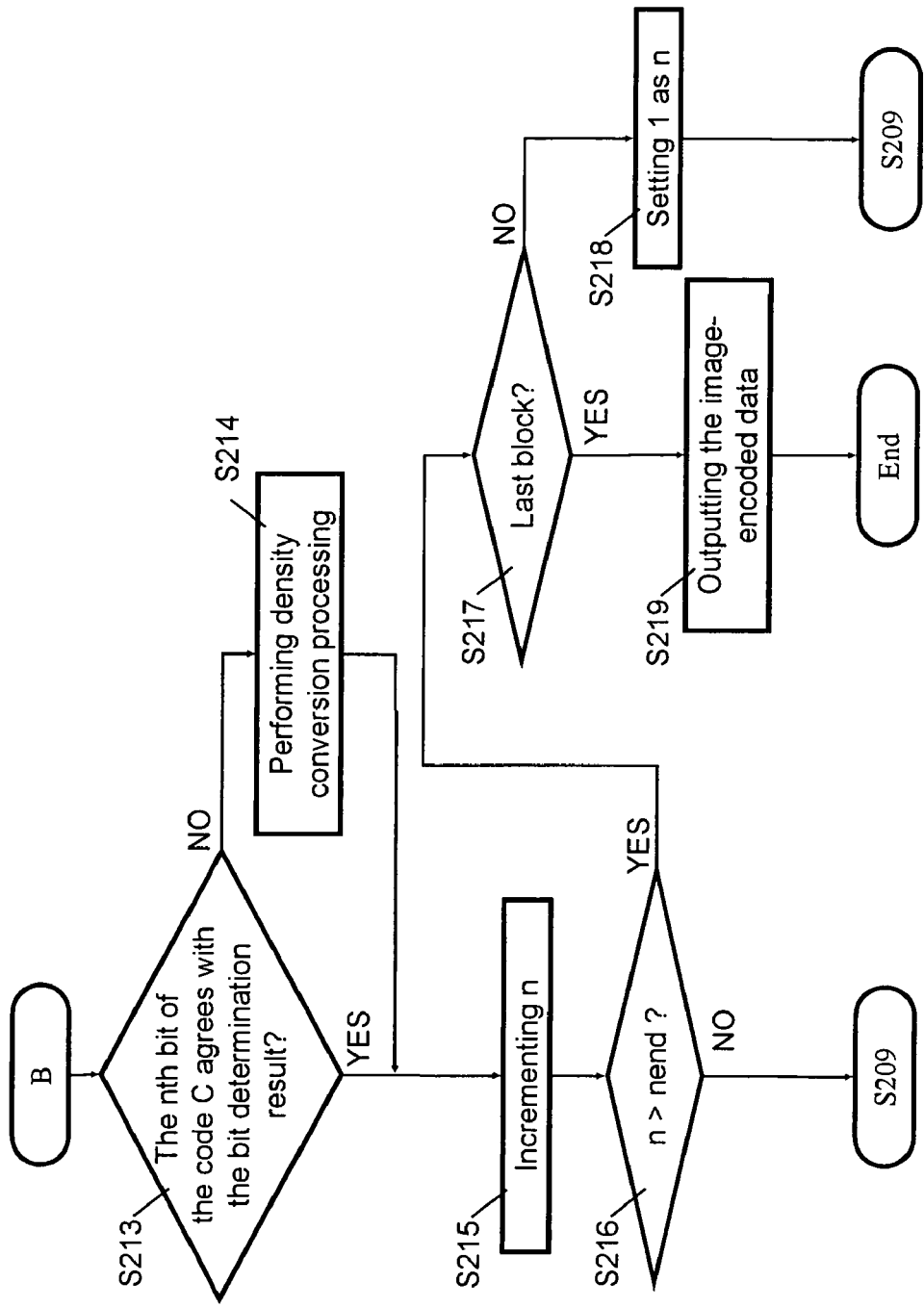
FIG. 12 is a flowchart (#4) showing encoding processing according to the embodiment of the present technique.

Having described that the size of a subject block and the size of the block core are compared in step S108 according to this embodiment, other configurations may be possible. Since the number of blocks to divide an image is constant according to this embodiment, an error may be outputted based on the number of blocks and the number of the block cores contained in an image. With reference to FIGS. 11 and 12, other configurations will be described below.

In step S201 in FIG. 11, the comparing means 150 obtains the code C. The processing moves to step S202.

In step S202, the comparing means 150 initially sets 1 as n. Here, n is a pointer to a bit of the code C. The expression, "n=1", corresponds to the leftmost bit "1" of the code C. The processing moves to step S203.

In step S203, the block dividing means 110 obtains the original image I0. The processing moves to step S204.

In step S204, the block dividing means 110 obtains the size of the original image I0. The processing moves to step S205.

In step S205, the block size determining means 160 calculates the size of the block core based on the aperture size. The size of the block core may be calculated in advance. The processing moves to step S206.

In step S206, the block size determining means 160 calculates the number of block cores that an image to be image-processed can contain based on the size of the image and the size of each block core. More specifically, the number of block cores is calculated by dividing the image by a predetermined size of the block core. The processing moves to step S207.

In step S207, the block size determining means 160 determines whether the number of block cores is higher than a predetermined number of blocks by comparing the number of block cores calculated in step S205 and the predetermined number of blocks. Here, the numbers of blocks and block cores are used as predetermined units for comparing blocks and block cores. When the number of block cores is higher than the predetermined number of blocks, the processing moves to step S209. On the other hand, when the number of block cores is lower than the predetermined number of blocks, the processing moves to step S208. In step S208, the block size determining means 160 outputs an error, and the processing exits. Since the processing in step S209 and subsequent steps is the same as the processing in step S109 and subsequent steps, which have been described with reference to FIGS. 7 and 8, the description will be omitted herein.

The processing in step S207 may compare the number of blocks contained on the first row of an image and the value resulting from the division of the horizontal length of the image by the horizontal length of the block core. Alternatively, the processing in step S207 may compare the number of blocks contained on the first column of the image and the value resulting from the vertical length of the image by the vertical length of the block core.

Figure 13:
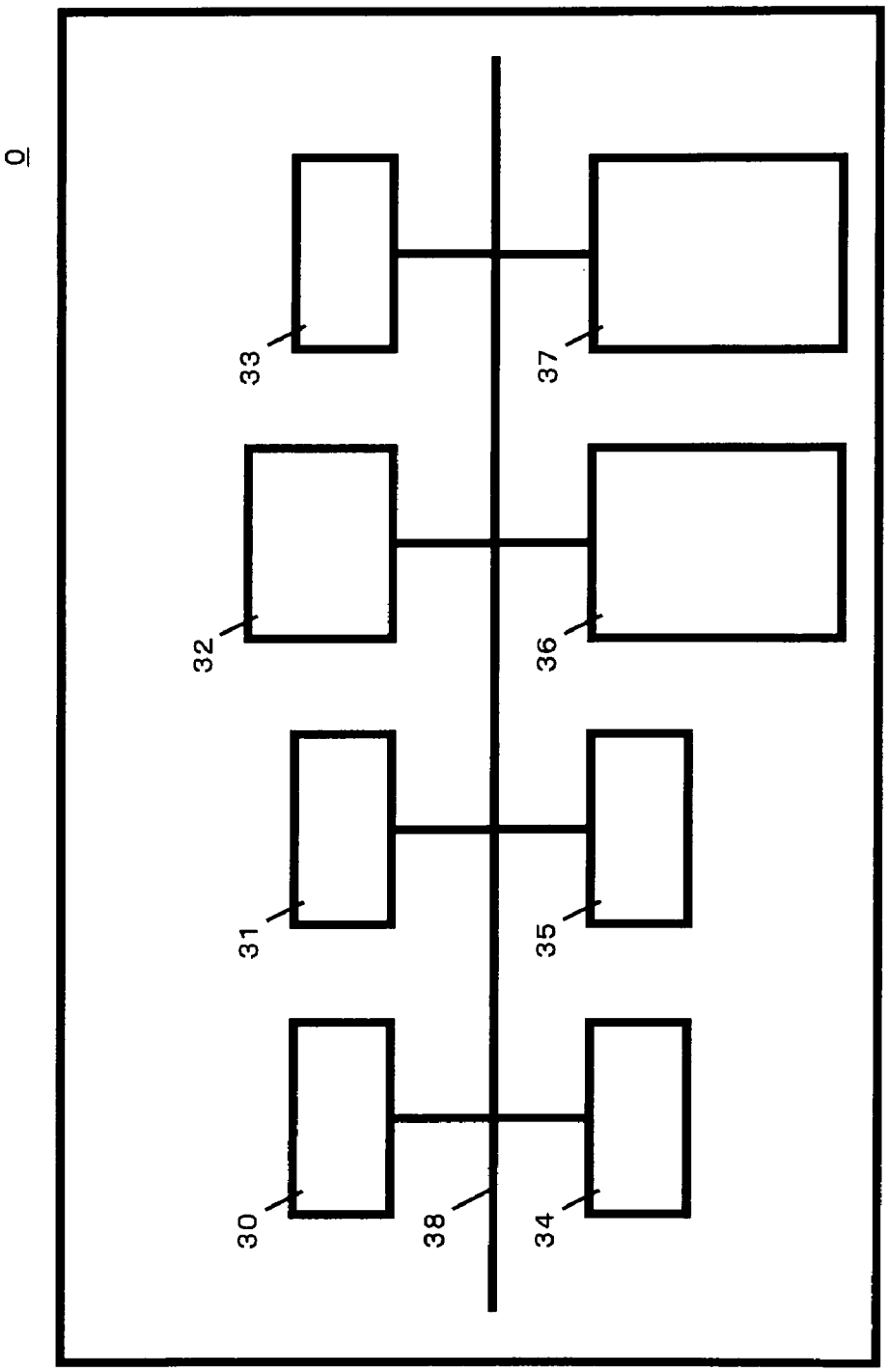
FIG. 13 is a diagram showing a configuration of an information processing apparatus according to an embodiment of the present technique.

The processing by the encoder 100 having described according to this embodiment may be implemented by executing a prepared program by an information processing apparatus. With reference to FIG. 13, an example of the information processing apparatus that executes a program for implementing a routine will be described below.

FIG. 13 is a diagram showing a hardware configuration of an information processing apparatus 0 included in the encoder 100 shown in FIG. 1. The information processing apparatus 0 includes an input device 30 that receives the input of data from a user, a monitor 31, a RAM (or Random Access Memory) 32, a ROM (or Read Only memory) 33, a media reader 34 that reads a program from a recording medium recording a program, a network interface 35 that exchanges data with other information processing apparatus over a network, a central processing unit (or CPU) 36 and a magnetic disk apparatus (such as an HDD or Hard Disk Drive) 37, which are connected via a bus 38.

When the information processing apparatus 0 supports the encoder 100, the HDD 37 prestores programs that function in the same manner as the aforesaid functions of the encoder 100. Then, the CPU 36 loads and executes a program from the HDD 37 to the RAM 32 to implement the encoder 100.

Executing the programs can implement the block dividing means 110, block extracting means 120, averaging means 130, registers 140l and 140r, comparing means 150, block size determining means 160 and encoding means 170, which are shown in FIG. 1.

The programs are not necessarily stored in the HDD 37 from the beginning. For example, the programs may be stored in a "portable physical medium" to be inserted to the information processing apparatus 0, such as a flexible disk (FD), a CD-ROM (or Compact Disk Read Only Memory), a DVD, a magneto-optical disk and an IC card, a "fixed physical medium" to be provided internally or externally to the information processing apparatus 0, such as a hard disk drive (or HDD), or "other information processing apparatus (or server)" to be connected to the information processing apparatus 0 over a public line, the Internet, a LAN (or Local Area Network), a WAN (or Wide Area Network) or the like. The information processing apparatus 0 may load and execute the programs therefrom.

The encoder 100 may be configured as hardware including the block dividing means 110, block extracting means 120, averaging means 130, registers 140l and 140r, comparing means 150, block size determining means 160 and encoding means 170.

Figure 14:
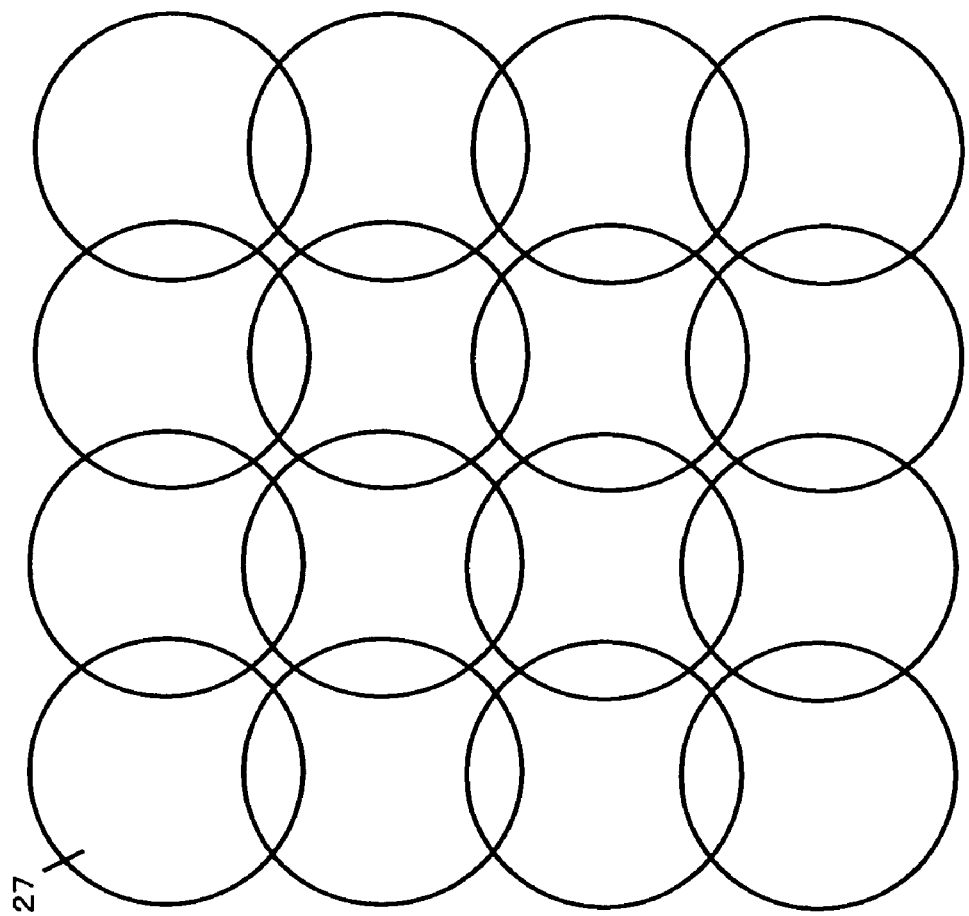
FIG. 14 is a diagram (#1) showing apertures.
Figure 15:
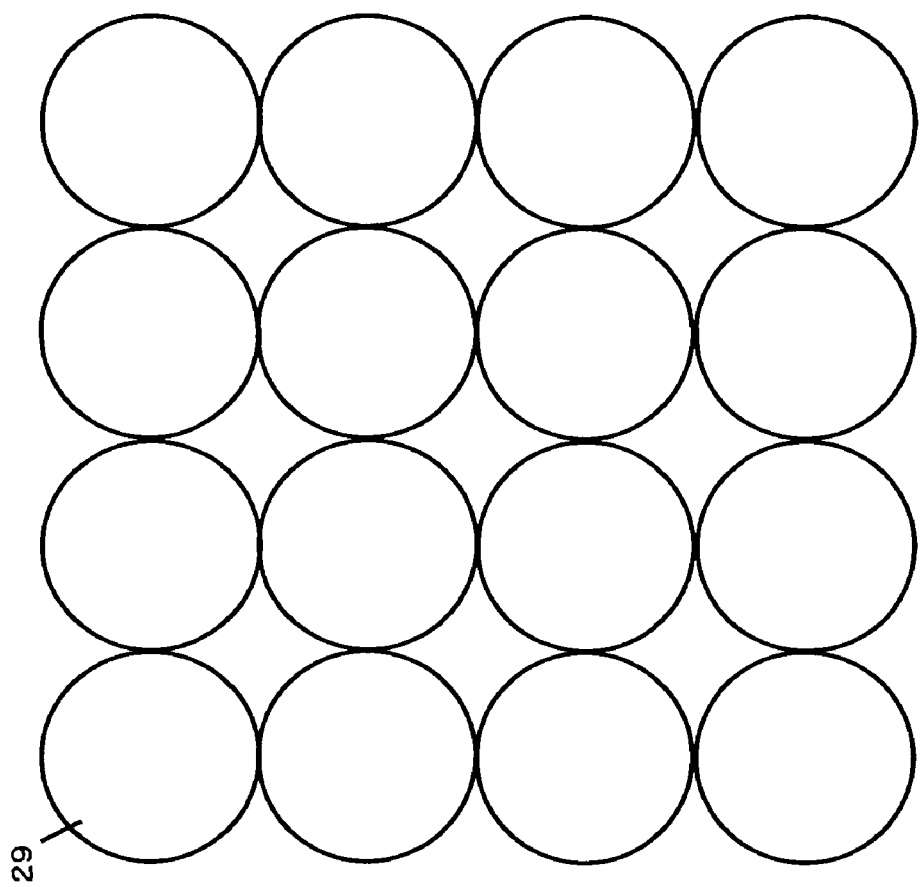
FIG. 15 is a diagram (#2) showing apertures.
Figure 16:
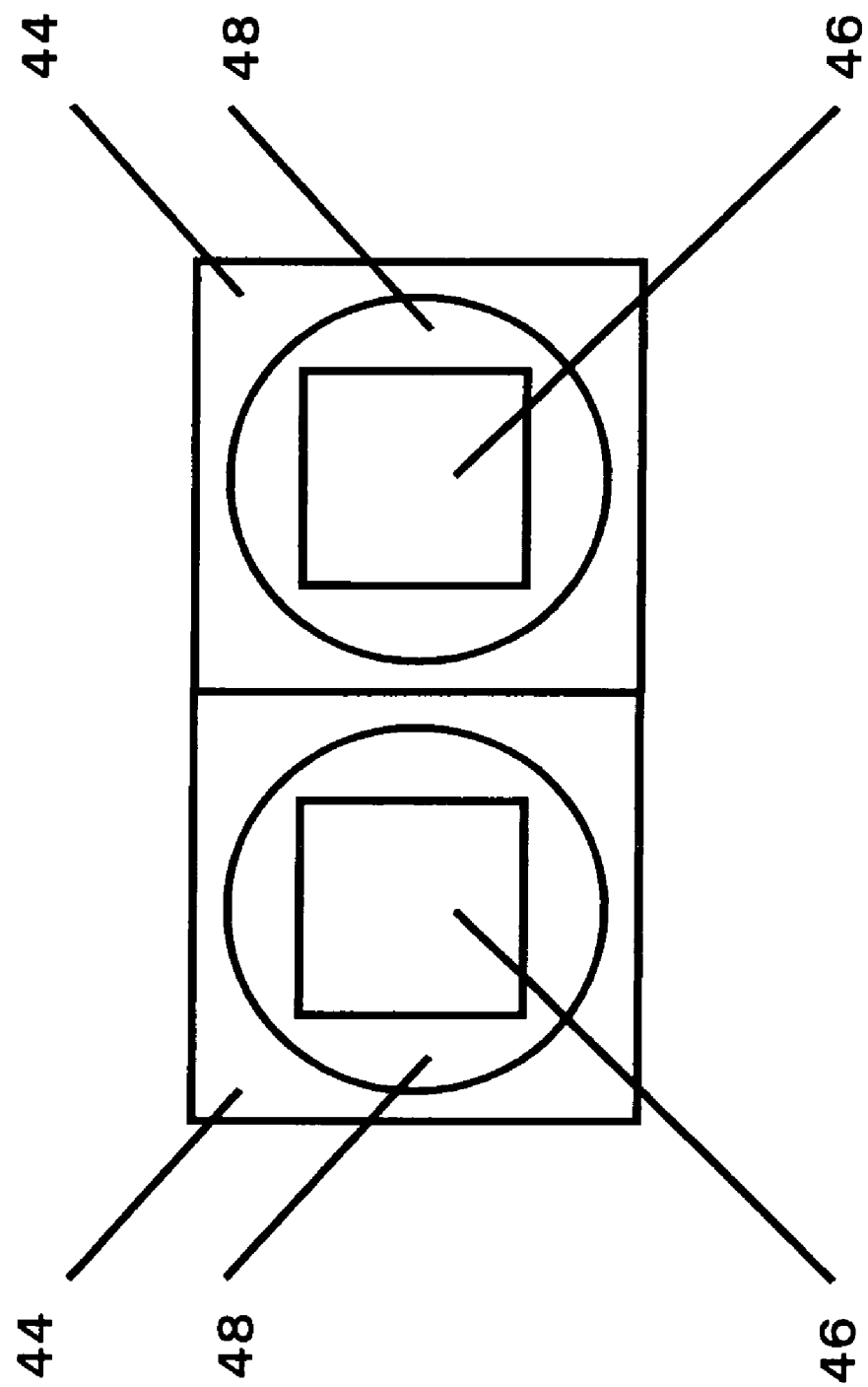
FIG. 16 is a diagram (#3) showing a relationship between apertures and block cores.
Figure 17:
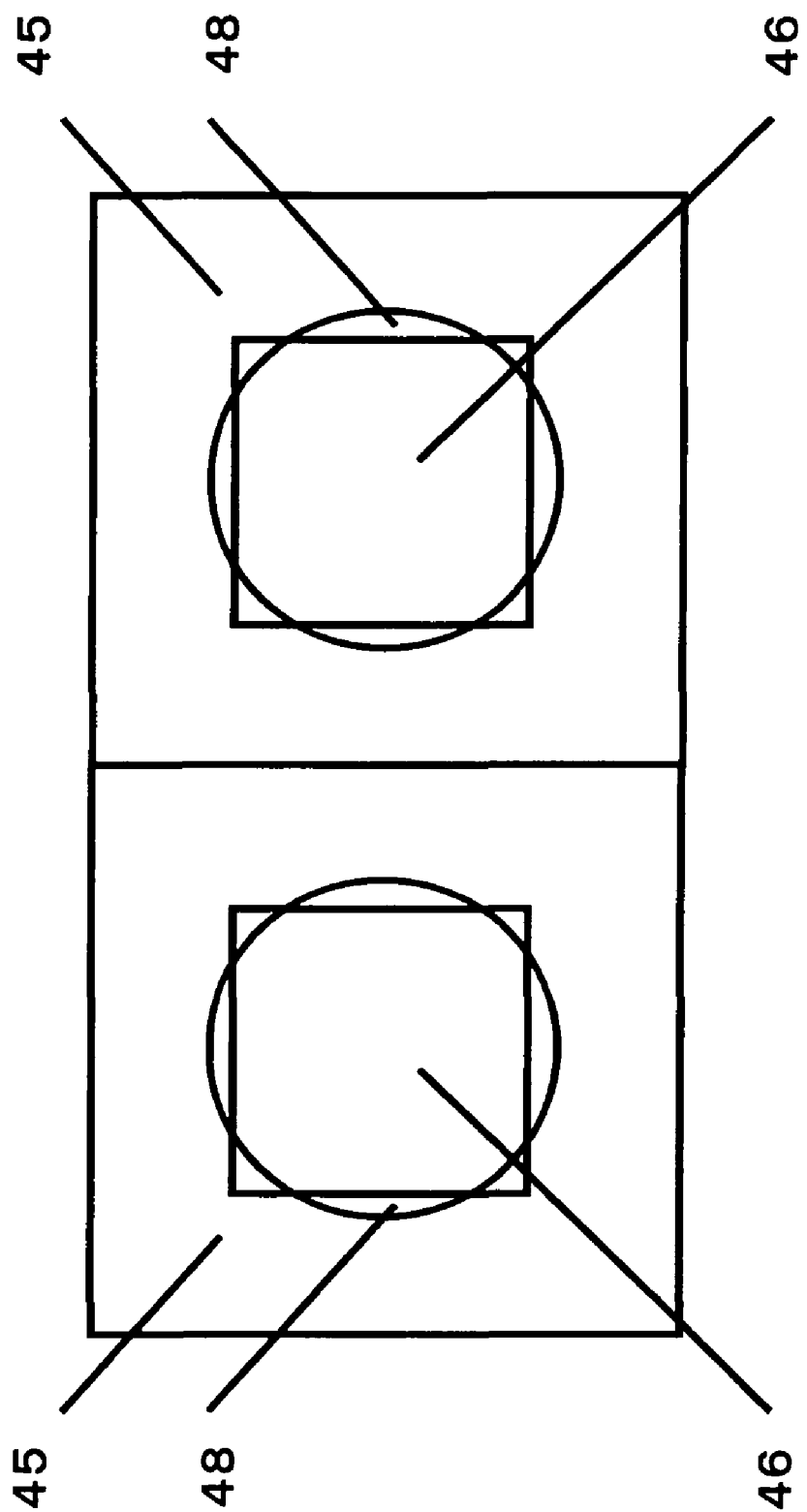
FIG. 17 is a diagram (#4) showing a relationship between apertures and block cores.
Figure 18:
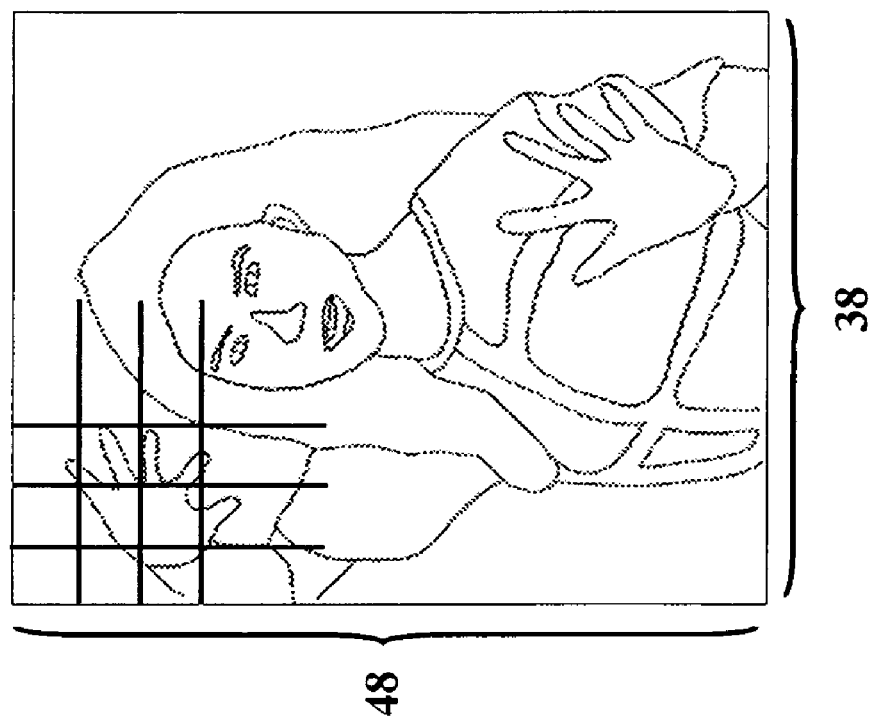
FIG. 18 is a diagram (#1) showing a relationship between an original image and the size of blocks.

Finally, the validity of embodiments of the present technique will be described. An image containing a code is decoded by using an image input device in a cellar phone, a digital camera or the like, for example. The image input device has a characteristic so-called aperture indicating the resolution power. As shown in FIG. 14, an image is photographed out of focus with an input device having larger apertures 27, that is, an input device for a wider range. On the other hand, an image is photographed in focus with an input device having smaller apertures 29, that is, an input device for a narrower range. Here, the aperture size uniquely depends on the input device and the distance from the input device to a subject and does not depend on a subject. For that reason, as shown in FIG. 16, as a result of embedding a code to a smaller image, the input device may capture images also in the area excluding the embedded area. That is, the aperture 48 lies largely off the block core 46 of the block 44, and the input device may capture an image around the block core as noise, which disables the decoding as a result. On the other hand, as shown in FIG. 17, embedding a code to an image in a normal size, the input device does not capture an image in the area excluding the embedded area. That is, the aperture 48 does not lie largely off the block core 46 of the block 45.

On the other hand, according to an embodiment of the present technique, data is embedded to an image by changing characteristic amounts especially in an area in a predetermined size on paper, irrespective of the size of the image. Therefore, data can be embedded to an even smaller image, and an input device can be prevented from capturing an image in an area excluding the area with especially changed characteristic amounts.

Figure 19:
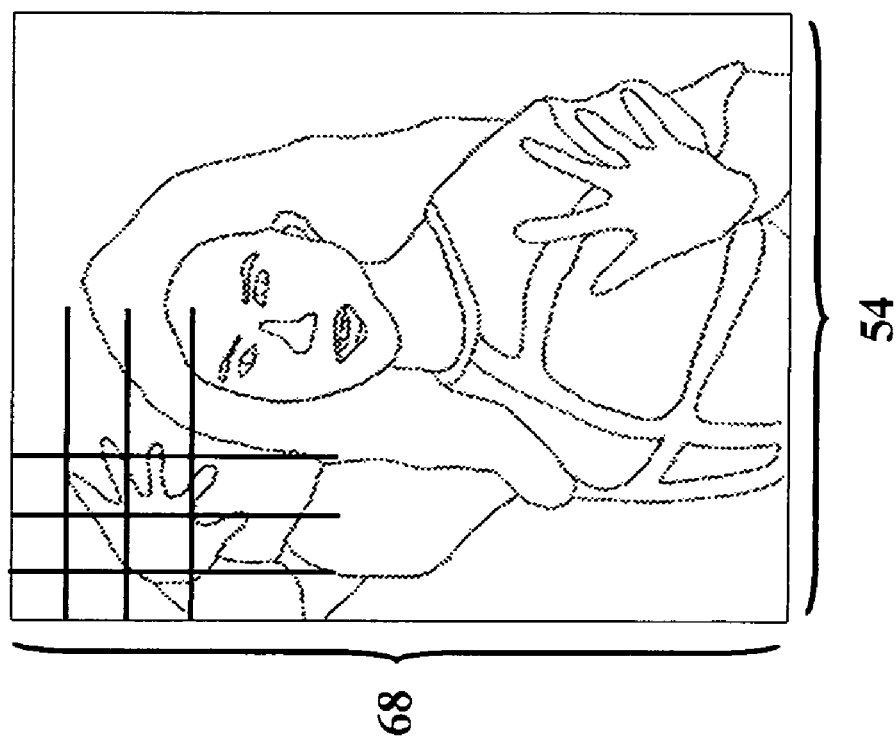
FIG. 19 is a diagram (#2) showing a relationship between an original image and the size of blocks.

According to an embodiment of the present technique, the size of blocks can be decreased with the image size as it is. In other words, by increasing the number of blocks contained in an image, the amount of data to be embedded can be increased. For example, the number of blocks can be changed from 38×48=1824 as shown in FIG. 18 to 54×68=3672 as shown in FIG. 19. Thus, the amount of data can also be increased from 912 bits to 1836 bits. According to an embodiment of the present technique, the size of blocks can be decreased to the size of block cores t/2×t/2 shown in FIGS. 9 and 10. In this case, the image is not deteriorated since the size of the area subject to change in density is constant on paper though the ratio of the size of the area subject to change in density is high in a block.

Though the size of apertures depends of the distance from an input device to a subject as described above, it can be assumed that multiple kinds of input device are used. In this case, the size of block cores may be determined based on the input device assumed to use with a largest aperture size.

Without specifying the size of aperture, a block core in an equal size to that of a block core, which has been actually used for a general image size, may be used.

What is claimed is:

1. A method of embedding information into an image comprising:
   obtaining an image data by taking the image by an image input device;
   dividing the image data into a plurality of blocks;
   determining an area in each of the blocks on the basis of a resolution power of the image input device, where a characteristic value may be modified in accordance with the information, respectively;
   comparing the size of the block with the size of the area;
   modifying a characteristic value of each of the blocks in accordance with the information to be embedded when the ratio of the size of the area with respect to the size of the blocks is smaller than a predetermined value; and
   obtaining a first number of the blocks with a second number being calculated on the basis of a size of the image and a predetermined size of the area.

2. The method of claim 1, wherein the modifying modifies the characteristic value of each of the blocks when the second number is not less than the first number.

3. The method of claim 1, further comprising outputting an error when the size of the area is not smaller than the size of the block.

4. An apparatus for embedding information into an image having an image input device, comprising:
   a storage for storing an image data by taking the image by the image input device; and
   a processor for dividing the image data into a plurality of blocks, determining an area in each of the blocks on the basis of a resolution power of the image input device, where a characteristic value may be modified in accordance with the information, respectively, comparing the size of the block with the size of the area, and modifying a characteristic value of each of the blocks in accordance with the information to be embedded when the ratio of the size of the area with respect to the size of the blocks is smaller than a predetermined value,
   wherein the processor further comprises obtaining a first number of the blocks with a second number being calculated on the basis of a size of the image and a predetermined size of the area.

5. The apparatus of claim 4, wherein the modifying modifies the characteristic value of each of the blocks when the second number is not less than the first number.

6. The apparatus of claim 4, wherein the processor further comprises outputting an error when the size of the area is not smaller than the size of the block.

7. A computer-readable recording medium that stores a computer program for embedding information into an image, by controlling an apparatus having an image data input device according to a process comprising:
   obtaining an image data by taking the image by an image input device;
   dividing the image data into a plurality of blocks;

determining an area in each of the blocks on the basis of a resolution power of the image input device, where a characteristic value may be modified in accordance with the information, respectively;

comparing the size of the block with the size of the area; and modifying a characteristic value of each of the blocks in accordance with the information to be embedded when the ratio of the size of the area with respect to the size of the blocks is smaller than a predetermined value, wherein said process further comprises obtaining a first number of the blocks with a second number being calculated on the basis of a size of the image and a predetermined size of the area.

8. The computer-readable recording medium of claim 7, wherein the modifying modifies the characteristic value of each of the blocks when the second number is not less than the first number.

9. The computer-readable recording medium of claim 7, wherein said process further comprises outputting an error when the size of the area is not smaller than the size of the block.

* * * * *

UNITED STATES PATENT AND TRADEMARK OFFICE
CERTIFICATE OF CORRECTION

| | | |
|---|---|---|
| PATENT NO. | : 8,103,052 B2 | |
| APPLICATION NO. | : 12/285245 | |
| DATED | : January 24, 2012 | |
| INVENTOR(S) | : Jun Moroo et al. | |

It is certified that error appears in the above-identified patent and that said Letters Patent is hereby corrected as shown below:

Title page, Column 1 (Title), Line 1, Delete "INFORMATON" and insert -- INFORMATION --, therefor.

Column 1, Line 1, Delete "INFORMATON" and insert -- INFORMATION --, therefor.

Signed and Sealed this
Tenth Day of April, 2012

David J. Kappos
*Director of the United States Patent and Trademark Office*